Dec. 21, 1926.  A. KASTELIC  1,611,532
BATTERY
Filed June 15, 1925
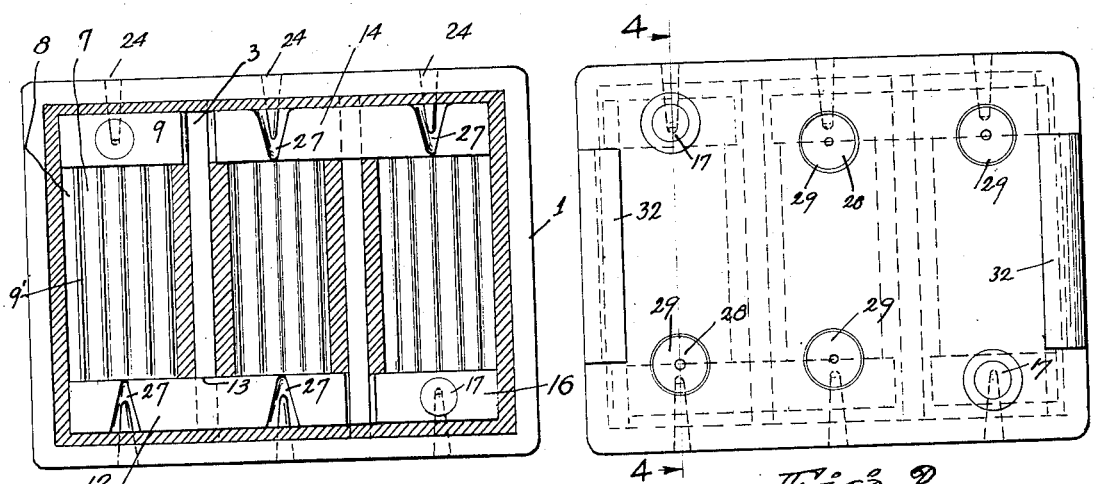
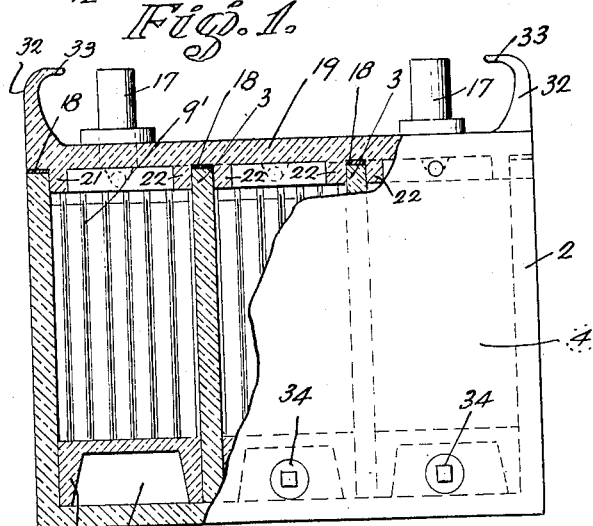
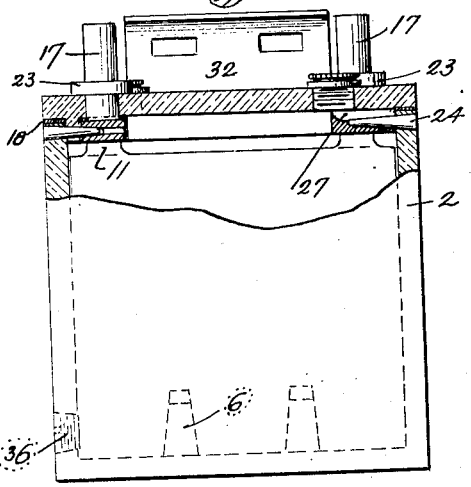
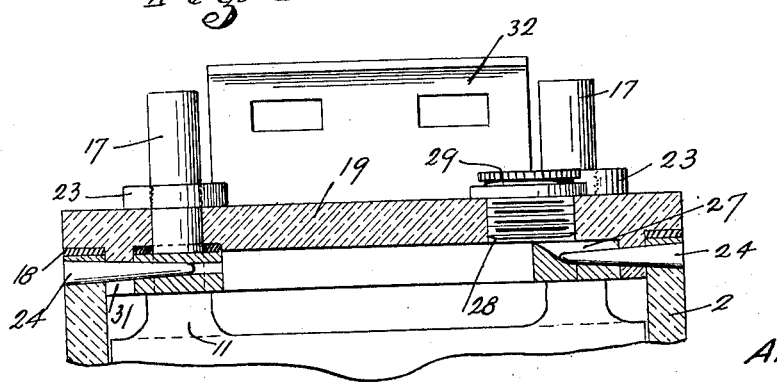
INVENTOR.
ANTHONY KASTELIC
BY
ATTORNEYS.

Patented Dec. 21, 1926.

1,611,532

UNITED STATES PATENT OFFICE.

ANTHONY KASTELIC, OF RICHMOND, CALIFORNIA.

BATTERY.

Application filed June 15, 1925. Serial No. 37,306.

The present invention relates to improvements in batteries, and its principal object is to provide a wet battery particularly adapted for use in motor vehicles and rugged and strong in construction.

The device described in the present application is an improvement on my battery illustrated and described in the co-pending application Serial No. 728,752, filed July 28th, 1924, and has for its principal features a single container divided by partitions into a plurality of cells in which the positive and negative plates may be assembled with a single common cover for the whole container made to seal the container and the cells against each other.

A further object of the invention is to provide fastening means for the cover which combine the container, the cover and the plates into one firm unit.

A further object of the invention is to provide manipulating means directly on the cover which do not project outside of the vertical space above the battery and which may be used by the operator without his hands leaving the said vertical space so that the battery may be easily slipped into a cage provided for the same and no additional space is necessary within the cage to accommodate the handles.

A further object of the invention is to provide means whereby the plates of different cells may be interconnected by straps disposed inside of the container so that no connection appears on the outside except the terminal posts.

A further object of the invention is to provide means allowing the cells of a battery to be flushed for the removal of any sediment that may have gathered in the bottom thereof.

Further objects and advantages of my device will appear as the specification proceeds.

The preferred form of my invention is illustrated in the accompanying drawing, in which—

Figure 1 shows a horizontal section of my battery taken immediately underneath the cover.

Figure 2 a top plan view of my battery.

Figure 3 a side elevation partly shown in section.

Figure 4 an end elevation with parts shown in section taken along line 4—4 of Figure 2, and Figure 5 an enlarged sectional detail view of the upper portion of the battery taken along line 4—4 of Figure 2.

While I have shown only the preferred form of the invention, it should be understood that various changes or modifications may be made within the scope of the claims hereto attached without departing from the spirit of the invention.

My battery 1 comprises a box-like container 2 preferably rectangular in form having a plurality of partition walls 3 dividing the box into a number of cells 4. Each cell has arranged in the bottom thereof a bridge 6 on which are supported the positive and negative plates 7, 8 and the interposed separators 9 commonly used in a wet cell. The battery shown in the drawing is of the three cell type ordinarily used in automobiles to provide a pressure of substantially six volts. The positive plates of one cell are interconnected by means of a strap 9 secured to lugs 11 rising from the plates near one corner thereof so that the strap lies parallel to one of the walls of the container but is spaced therefrom for purposes hereinafter described. The negative plates of the same cell are interconnected in a similar manner by the strap 12 arranged to run parallel to the opposite wall of the container and in spaced relation thereto and extending through a slot 13 in the partition 3 into the next cell where it is connected in a similar manner to the positive plates of this cell. The negative plates of the second cell are interconnected and are also connected with the positive plates of the third cell by means of a strap 14 passing through a slot in the second partition of the container, while the negative plates of the third cell are interconnected by means of a strap 16. The two straps 9 and 16 have terminal posts 17 rising therefrom and all the straps are arranged within their respective cells so that the top face of the straps is flush with the top edges of the container when they are forced into the recesses 13 in the partitions provided for the same. A gasket 18 is preferably provided on the top edges of the container and the partitions. A single cover 19 is provided for the whole container and is formed with a flange 21 lining the inner face of the container and with other flanges 22 straddling the partitions 3. When the cover is firmly pressed upon it bears on the upper faces of the straps so as to force the straps 12 and 14 in the grooves provided for the same and to firmly hold all the straps and all the plates against endwise or any other motion.

The cover is perforated above the plates 9 and 16 so as to allow the terminals 17 to extend through the same and nuts 23 may be threaded on the terminals for holding the cover in place and also for preventing leakage around the terminals.

The cover is furthermore held in place by means of a plurality of pins 24 extending through the side walls of the container and through the flanges 21 of the cover into the straps overlying the plates so that the pins perform two functions, namely, that of holding the cover down and the additional function of holding the straps and the plates down. It will be noted that six pins are provided in the three cell battery illustrated, two of the pins being arranged below the terminals 17 and the other four pins being evenly distributed so that a pair of pins is provided for each cell. The four latter pins extend into recesses 27 formed in the top faces of the two straps 12 and 14 and may be backed out if it is desired to remove the cover by the introduction of a punch or similar tool through apertures 28 provided in the cover and normally closed by plugs 29. Where the two terminal pins 24 extend through the flanges 21, the latter are slotted from the pin hole downwardly as shown at 31 so that the pins do not interfere with the removal of the cover.

One outstanding feature of my invention is that the handles 32 are provided on the cover instead of on the container itself whereby the space occupied by the whole battery is reduced. The handles are further arranged in such a manner that their tops curve inwardly as shown at 33, so that a person may get hold of the battery by placing his hands back to back and passing his finger tips underneath the curved portion of the handles. If manipulated in this manner, the hands of the operator do not extend beyond the vertical planes of the container which allows of easy insertion into and removal from the cage normally provided for the battery in automobiles.

Each cell is preferably provided at the bottom thereof with a drain hole 34 adapted to be plugged as shown at 36 so as to allow the cell to be washed out by flushing water through the same, the water being introduced through the holes 28 and leaving through the holes 34.

The advantages of my battery and the manner of assembling and disassembling the same will be readily understood from the foregoing description. The several plates may be formed into a unit with their respective straps before they are introduced into the different cells, that is, the three positive plates of the first cell may be fixed to the strap 9, the three negative plates of the same cell and the three positive plates of the next cell may be fixed to the strap 12 and so on, so that the whole battery may be assembled in large units. After the plates and the straps are placed into the cells in operative relation and after separators have been placed and electrolyte has been introduced, the cover may be applied, the screws 23 turned down and the pins 24 inserted from the side whereby cover, container and straps are combined into one solid unit. The whole battery may now be readily manipulated by means of the handles 32 rising from the cover in the manner previously described.

To disassemble the battery the plugs 29 are unscrewed, a punch is placed to engage the point of a pin 24 and a hammer applied to the punch for the purpose of backing out the pin. The four pins associated with the long straps are removed in this manner, while the two pins 24 associated with the terminals are left in place since they do not interfere with the removal of the cover. After the nuts 23 have been removed, the cover may be lifted off and the remaining pins 24 may be readily removed as will appear from viewing Figure 5. Now each unit of plates may be lifted out for inspection and repair.

If it is only desired to clean the battery, the electrolyte may be drawn off through the holes 34 whereupon water may be forced through the cells for removal of any sediment that may have settled in the bottom of the battery.

I claim:

1. In a wet cell of the character described, a container, positive and negative plates assembled therein, straps connecting plates of similar polarity and disposed along opposite edges of the container and spaced therefrom, a cover for the cell having flanges depending therefrom extending into the space between the walls of the container and the straps, and means for binding the cover, the container and the straps into one unit comprising pins extending through the wall and the flanges and resting on the straps, the cover being formed with perforations over the inner edges of the pins so as to allow a tool to be inserted therethrough for backing out the pins to clear the cover for removal.

2. In a wet cell of the character described, a container, positive and negative plates assembled therein, straps connecting plates of similar polarity and disposed along opposite edges of the container and spaced therefrom, a cover for the cell having flanges depending therefrom extending into the space between the walls of the container and the straps, and means for binding the cover, the container and the straps into one unit comprising pins extending through the wall and the flanges and resting on the straps, the cover being formed with perforations over the inner edges of the pins so as to allow a tool to be inserted therethrough for backing out the pins to clear the cover for removal, and the straps being recessed for receiving the pins so as to allow the cover to immediately rest on the straps in intimate contact therewith.

ANTHONY KASTELIC.